(12) United States Patent
Wolff

(10) Patent No.: US 7,976,724 B2
(45) Date of Patent: Jul. 12, 2011

(54) METHOD OF PREVENTING EMANATION OF DUST FROM A COAL PILE OR RAILCAR

(75) Inventor: Andrew R. Wolff, Darien, IL (US)

(73) Assignee: Benetech, Inc., Aurora, IL (US)

( * ) Notice: Subject to any disclaimer, the term of this patent is extended or adjusted under 35 U.S.C. 154(b) by 738 days.

(21) Appl. No.: 11/452,077

(22) Filed: Jun. 9, 2006

(65) Prior Publication Data

US 2006/0243946 A1   Nov. 2, 2006

(51) Int. Cl.
*C09K 3/22* (2006.01)
(52) U.S. Cl. ............................ 252/88.1; 299/12; 404/76
(58) Field of Classification Search ................ 252/88.1, 252/500, 88; 134/25.1, 18; 299/12; 427/212, 427/244, 220, 221; 44/577, 602; 95/154, 95/150; 209/17; 524/269, 547; 404/76
See application file for complete search history.

(56) References Cited

U.S. PATENT DOCUMENTS

| | | | | |
|---|---|---|---|---|
| 1,910,975 A * | 5/1933 | Wallace | ........................... | 44/602 |
| 2,516,633 A | 7/1950 | Kesler et al. | | |
| 3,954,662 A * | 5/1976 | Salyer et al. | ................. | 252/88.1 |
| 4,055,471 A * | 10/1977 | Beck et al. | ........................ | 201/20 |
| 4,169,170 A | 9/1979 | Doeksen | | |
| 4,238,536 A | 12/1980 | Koch et al. | | |
| 4,376,700 A * | 3/1983 | Irons | ................................. | 209/17 |
| 4,380,459 A * | 4/1983 | Netting | ........................... | 95/150 |
| 4,400,220 A * | 8/1983 | Cole, Jr. | ........................... | 134/18 |
| 4,417,992 A * | 11/1983 | Bhattacharyya et al. | .... | 252/88.1 |
| 4,428,984 A * | 1/1984 | Shimizu et al. | ................. | 427/220 |
| 4,551,261 A * | 11/1985 | Salihar | ............................ | 299/12 |
| 4,561,905 A * | 12/1985 | Kittle | ............................. | 134/25.1 |
| 4,582,511 A * | 4/1986 | Siddoway et al. | ............... | 44/577 |
| 4,642,196 A * | 2/1987 | Yan | ................................... | 299/12 |
| 4,737,305 A | 4/1988 | Dohner | | |
| 4,801,635 A | 1/1989 | Zinkan et al. | | |
| 4,828,576 A * | 5/1989 | Bixel et al. | ........................ | 44/501 |
| 4,836,945 A | 6/1989 | Kestner | | |
| 4,960,532 A * | 10/1990 | Kremer | ......................... | 252/88.1 |
| 4,971,720 A | 11/1990 | Roe | | |
| 5,128,178 A * | 7/1992 | Roe | ................................. | 427/244 |
| 5,143,645 A * | 9/1992 | Roe | ................................. | 516/19 |
| 5,409,626 A | 4/1995 | Muth | | |
| 5,415,795 A * | 5/1995 | Roe et al. | ........................ | 427/212 |
| 5,436,429 A | 7/1995 | Cline | | |
| 5,576,056 A * | 11/1996 | Roe | ................................. | 427/221 |
| 5,681,878 A * | 10/1997 | Klotzsche et al. | ............ | 524/269 |
| 6,372,842 B1 * | 4/2002 | Grisso et al. | ................... | 524/547 |
| 6,790,245 B2 * | 9/2004 | Wolff et al. | ...................... | 44/602 |
| 6,846,502 B1 | 1/2005 | Billmers et al. | | |
| 2004/0065198 A1 * | 4/2004 | Wolff et al. | ...................... | 95/154 |
| 2004/0195545 A1 * | 10/2004 | Gay et al. | ....................... | 252/88.1 |
| 2004/0227126 A1 * | 11/2004 | Wynne et al. | ................ | 252/88.1 |

FOREIGN PATENT DOCUMENTS

RU     2061641 C1 *  6/1996
SU     1101445 A  *  7/1984

OTHER PUBLICATIONS

"Process for Suppression of Coal Dust", Research Disclosure, 276, 237, Apr. 1987.*
Surfactants and Interfacial Phenomena, 2d Ed., Milton Rosen, Wiley Interscience Publications (1989), pp. 207-239, 240-275, 276-303, and 337-362.

* cited by examiner

*Primary Examiner* — Mark Kopec
*Assistant Examiner* — Khanh Tuan Nguyen
(74) *Attorney, Agent, or Firm* — Ungaretti & Harris LLP

(57) ABSTRACT

A method for treating a mass of coal to suppress emanation of coal dust therefrom, the mass of coal having, prior to treatment, an exposed surface from which dust may emanate, comprises applying to the exposed surface an aqueous fluid comprising gelatinized starch to form a layer of the fluid over the surface and drying the layer of the fluid to form a crust over the surface.

19 Claims, No Drawings

METHOD OF PREVENTING EMANATION OF DUST FROM A COAL PILE OR RAILCAR

BACKGROUND OF THE INVENTION

1. Field of the Invention

The present invention relates to dust suppression, and more particularly to suppression of dust emanation from coal by application of a dust suppressant composition to the surface of a coal pile or railcar.

2. Description of the Prior Art

Many efforts have been undertaken over many years to avoid or to alleviate the problem of dust emanation from handling, conveying, transporting and even storing masses of coal. As used herein, the phrase "mass of coal" refers to any conglomeration of coal lumps or pieces. At one time, petroleum-based compositions were applied to coal masses to suppress dust emanation from the coal. However, with the rising prices of petroleum, more recent efforts typically have involved the use of water and chemical dust suppressants that are applied to the coal. Although the categories of dust suppressants have overlapped to some extent in that certain types of suppressants may be reformulated to be applied through a system designed for another type, conventionally a suppressant may fall into the category of a short term dust suppressant, which may be a wet suppressant or a foam suppressant, or a long term residual dust control suppressant. Short term dust suppressants function typically by coating the source and dust with water. Thus, such suppressants lose their effectiveness upon exposure to various environments and weather conditions. For example, they tend to become less effective as the water evaporates upon exposure to heat, dry air or the Sun, or as rain washes the suppressant away. Moreover, their effectiveness generally does not persist beyond one to two impact points; that is, points at which dust is generated during handling or movement of the coal or other source. Examples of wet and foam suppressants are discussed in U.S. Pat. No. 4,737,305 to Dohner, U.S. Pat. No. 4,836,945 to Kestner, U.S. Pat. No. 4,971,720 to Roe, and U.S. Pat. No. 5,409,626 to Muth, and in Surfactants and Interfacial Phenomena, 2d Edition, by Milton J. Rosen, Wiley Interscience Publications (1989), all of which are incorporated herein by reference. Conventionally, long term residual dust suppressants control dust by means of the formation of a polymer or binder film over the dust source and thereby persist even after evaporation of water in the suppressant. Such suppressant compositions typically contain a binder composition such as lignosulfonate and a polymeric dispersant. For example, U.S. Pat. No. 5,436,429 to Bennett describes such a long term dust suppressant and mentions in passing that certain sugar by-products may be used as a binder or tackifier. However, binders such as lignosulfonates and polymeric binders or dispersants are costly and may create waste disposal problems in that they add additional ingredients to the coal.

Wet suppression is based on what is called "wet technology." This suppression can be as simple as spraying large amounts of water on the coal (or other source) as it travels along a conveyor or drops to a storage pile or transfer bin. However, although water is an effective dust suppressant, its use involves a number of drawbacks, such as adding weight to the coal or other source (which can result in higher costs for transporting the source), development of substantial vapor pressure when the coal or other source is heated or burned, and the absorption and thus wasting of substantial energy as the water vaporizes when the coal or other source is heated or burned.

As a result, surfactants or "wetters" often are added to the water to reduce the amount of the water needed for dust suppression. Conventional wetters include nonionic epoxide (e.g., ethylene oxide or propylene oxide) derived block co-polymers, alcohols of from about eight to about sixteen carbons ethoxylated with from about four to about ten moles of ethylene oxide (wherein the alcohol may be an aromatic such as alkyl phenol, preferably nonylphenol, which can be ethoxylated with, for example, ten moles ethylene oxide), and branched nonionic surfactants such as branched alpha sulfo ester salts comprising an acid chain and an alcohol chain of from about six to about twelve carbons each, and highly branched alcohol sulfate and alcohol ether sulfate detergents. Generally, the wetter is added to the water in a weight proportion of from about 0.1 to about 5 parts of the wetter to about one thousand parts of water. As this concentration, the wetter acts at the interface between the coal (or other source) and the water to increase the affinity of the coal and water, thereby decreasing the amount of water needed to soak the coal as well as decreasing the time required for the water to penetrate the coal stream.

Typically, such wet technology is employed to suppress dust generated at transfer points, areas where the coal falls freely from one point to another (free falls) such as loading points where the coal is dropped into a vessel for transportation, impact points where the coal strikes a surface, transfer points where coal drops from one conveyor to another, and storage areas. The water is applied at the point of dust generation and is applied to the air-borne dust as well as to the source of the dust. If the amount of water added to the coal is sufficiently great, the coal can be prevented from dusting significantly on impact. For such benefits, the water should be added in an amount sufficient to result in a proportion of one-quarter to one part by weight water per one hundred parts by weight wetted coal. However, because the suppressant is effective only through one or two impact points where dust could be generated, repeated applications are necessary, thereby increasing the water content of the wetted coal quickly to around one or two percent. Such suppression typically will last no more than a few hours, and even less in acidic environments.

Foam suppressants are applied to form a blanket over the coal or other source to capture and smother dust. Bubbles in the foam suppressant catch the dust particles and so the foam suppressant is effective only until the bubbles break or the layer of foam becomes discontinuous. The foam suppressant is formed by addition of a foamer to water. Conventional foamers include alpha-olefin sulfonates, alkylphenyl sulfonates with long alkyl chains (e.g., eight to sixteen carbons) such as sodium lauryl benzene sulfonate, alcohol sulfates, alcohol ether sulfates, alpha sulfo esters and mixtures of such compounds. Under standard conditions, from about four to about twenty parts by weight foamer is added to about one thousand parts by weight water. The resulting foam has about five to ten percent of the density of the water used in wet technology and so much less water is needed for a foam to provide the same dust suppression as the wet suppressant. Thus, the foam suppressant can be added to the coal in a proportion such that the wetted coal contains 0.2 to 0.5 parts by weight added water per one hundred parts by weight wetted coal. However, the foam suppressant is effective only to the first impact point, after which it no longer maintains a continuous foam blanket over the dust generating material. Thus, repeated applications are necessary and the water content of the wetted coal increases quickly to several percent.

As with wet suppressants, the foam suppressants are employed to suppress dust generated at impact or transfer points, areas where the coal falls freely from one point to another (free falls) such as loading points where the coal is dropped into a vessel for transportation, impact points where the coal strikes a surface, transfer points where coal drops from one conveyor to another, and storage areas. The foam is applied as a curtain or barrier to capture generated dust. The foam applicator nozzles are located in such a way that the remaining foam and the captured dust are deposited back onto the moving coal stream. This orientation not only prevents dust from escaping into the environment, but also places at least a partial blanket of foam onto the deposited coal, which may prevent dust generation until bubbles are broken or disrupted by another transfer point. The dust suppression effects of normal foam do not carry over from a previous application point to further impact zone.

Long term residual dust control suppressants are used to prevent generation of dust during long term storage or during transportation. Such long term residual suppressants operate by a mechanism very different from those of short term residual suppressants to which the subject invention is directed. In short term residual (wet or foam) suppression, the water eventually evaporates, rendering the suppressant ineffective in suppressing dust over a long term, such as during several days of outdoor storage. Long term residual dust suppressants remain active long after the water evaporates. They ordinarily have some film-forming or tackifying properties. For example, U.S. Pat. No. 4,801,635 to Zinkan et al. describes a long term residual dust suppressant that includes an acrylic polymer and U.S. Pat. No. 4,169,170 to Doeken describes a long term residual dust suppressant that includes an aqueous suspension of asphalt emulsion concentrates or black liquor lignin products such as lignosulfonates as a binder material. Conventionally, water is included in a long term residual suppressant typically not only to provide some dust control during handling prior to storage, but also to promote even spreading as the suppressant is applied. Long term residual dust suppressants often contain wetters or foamers as well to minimize the amount of water needed to apply the suppressant to the coal and are applied directly to the coal in what is known as a "main body treatment."

Thus, several problems are associated with conventional wet and foam dust suppression techniques to which the subject invention is directed. For example, each technique involves addition of a substantial amount of water to the coal or other dust source, especially in view of the repeated applications of water-based suppressant necessary to control dust across several impact or transfer points. The resulting high water content of the coal is particularly undesirable in that much dust suppression is performed at fossil fuel power plants. Water added to the fuel results in a portion of the heat output of the coal to be lost to vaporization of the water and so a loss of effective energy. The vaporization of water consumes substantial amounts of heat. Therefore, the addition of such significant amounts of water is particularly troublesome. In addition, the additional water increases the weight of the coal and so increases shipping costs accordingly.

In addition, binding agents, wetting agents, lignosulfonates, polymers and volatile organic compounds ("VOC's") are often required in the conventional dust suppressants. For example, U.S. Pat. No. 4,417,992 teaches a suppressant comprising acrylamides and acrylamide polymers. U.S. Pat. No. 4,238,536 describes a petroleum/rosin gel. Such ingredients often can be undesirable as well in that their use increases the cost of the suppressant and can raise problems in disposal and clean-up and other problems associated with the transport and burning of the coal.

U.S. Pat. No. 4,642,196 discloses a method for controlling coal dust with a suppressant based on a gelatinized starch, but the suppressant techniques disclosed therein appear to employ relatively large quantities of starch (0.05% to 10% based on pounds of starch to pounds of coal), with the concomitant disadvantages of high volume suppressant applications as discussed above, in a high concentration composition. Further, the reported composition is of high viscosity, rendering handling difficult, thereby requiring application at elevated temperatures. Moreover, application of the suppressant in the noted patent apparently not as a blanket barrier over the mass of coal, but as a penetrating composition that permeates throughout the mass of coal for bulk treatment as opposed to blanketing the mass of coal to produce a crust thereover. U.S. Pat. No. 4,642,196 does refer to application "on top of the coal car and the top of stock piles." However, a reading of the patent in its entirety suggests that the inventor therein teaches appropriate sites for placement of spray manifolds for application of the treatment of moving coal.

Because of the substantial disadvantages associated with the addition of such significant amounts of water, the industry has attempted to minimize the amount of water employed in wet and foam suppression techniques. Such attempts typically involve the use of systems for application of the suppressant at each dust producing site instead of a single application that would be intended endure various environmental activity for relatively long-lasting suppression despite evaporative conditions or rain or even both. Because the suppressant in the multiple application technique remains effective for only one or two transfer points and are destroyed by evaporation or rain, such techniques are expensive; they require costly installation of application equipment at several transfer points, impact points and loading or "stack-out" storage sites. In addition, impact sites where dust is generated often are not accessible to the equipment employed in conventional application systems. Thus, such techniques are undesirable.

SUMMARY OF THE INVENTION

Briefly, therefore, the present invention is directed to a novel method for treating a mass of coal to suppress emanation of coal dust therefrom. The mass of coal has, prior to treatment, an exposed surface from which dust may emanate. The method comprises applying to the exposed surface an aqueous fluid comprising gelatinized starch to form a layer of the fluid over the surface and drying the layer of the fluid to form a crust over the surface.

Among the several advantages found to be achieved by the present invention, therefore, may be noted the provision of an effective and long-term method for suppressing emanation of dust; the provision of such method that avoids the need for lignosulfonates; and the provision of such method that obviates the need for synthetic polymers.

DESCRIPTION OF THE PREFERRED EMBODIMENTS

In accordance with the present invention, it has been discovered that an aqueous and fluid dust suppressant comprising a surprisingly small amount of gelatinized starch and spread over a mass of coal dries to form a layer in the form of a crust over the mass of coal that is surprisingly effective and sufficiently long-lasting dust suppression without the need for high temperatures or binding agents, wetting agents, lignosulfonates or synthetic polymers. Moreover, while it has been found that the starch content of this suppressant is so low that even suppressants derived from unmodified starch is of low enough viscosity to be useful, it has further been discovered that if the suppressant is derived from starch that has been partially (or "lightly") modified such as by ethoxylation or other similar modification, the resulting gel is of even lower viscosity, allowing far easier handling and application. Thus, the present invention provides a dust suppressant that is durable yet biodegradable and free of VOC's. In fact, in its preferred form, over-sprays or spills of the suppressant of this invention may be cleaned up with soap and water or simply left to dry and be swept up. Also, because the application rate of the suppressant of this invention is so low, it can be employed in situations where water is scarce or where use of large quantities of water are otherwise undesirable. And because starch is readily available, low cost and used in low quantities in the present invention, the present invention provides a very low-cost dust suppression technique.

By "fluid" what is meant is that the suppressant is flowable. Preferably, the suppressant as applied is a liquid and is flowable at ambient temperatures and pressure, such as temperatures under 100° F. and at atmospheric pressure. The fluid may be prepared by cooking an aqueous mixture of starch (which may or may not be modified) at a temperature to rupture the starch granules to create a homogeneous, translucent gelatin. The starch that is cooked may or may not be modified and, unless specifically identified herein as modified or unmodified, the term "starch" is used herein to refer to modified starch as well as unmodified starch.

Unmodified starch may be used in the mixture, but mixtures prepared from unmodified starch have been found to exhibit a dramatic rise in viscosity and incorporating unmodified starch at a level of even 5% by weight, based on the total weight of the mixture may produce a gel upon cooling to room temperature. This phenomenon, called "setback," is most evident in starches with a high amylose content. This setback, often observed with starches having a high proportion of linear α-D-glucose polymers, is believed to be a crystallization effect in which the long chains of poly-α-D-glucose self-associate, forming extended networks throughout the mixture. It is less evident, however, in starches with high amylopectin content; instead, amylopectin starch is a branched polymer and the branching tends to break up the ability of he polymer chains to crosslink and crystallize. Starches with high amylopectin content include tapioca, waxy maize, and waxy rice. Other starches may be derived from potatoes, corn, waxy corn, wheat, sorghum, rice, barley, and cassaya. Thus, references herein to "starch" includes mixtures of starches or starches from different sources, as well as a single type of starch. "Starch" also includes partially processed starch and cellulosic derivatives.

Although unmodified starch may be used, modified starches are preferred. For example, prior to the cooking step, the starch be chemically modified. For example, the starch may be partially depolymerized to remove long chain polymers that otherwise would associate to cause setback. Alternatively, the starch may be etherified, preferably hydroxyalkoxylated, preferably with low molecular weight etherifying agents, such as etherifying agents of up to about six carbon atoms. The hydroxyalkoxylation occurs along the starch chain to prevent the association of the starch molecules that would cause setback. Thus, the most desirable modified starches result in lower viscosity fluids and so inhibit, reduce, or eliminate the setback problem.

U.S. Pat. No. 2,516,633 identifies certain preferred etherifying agents and its disclosure, which also illustrates starch etherification that may be employed to prepare a modified starch useful in the present invention, is incorporated herein by reference. The hydroxyalkoxylation or other etherification occurs along the chain, preventing, reducing or inhibiting the association that causes setback. It is desired that the pendent hydroxyalkoxy groups resulting from hydroxyalkoxylation are low molecular weight groups; that is, they contain two to about six carbon atoms. As used herein, the phrase "low molecular weight hydroxyalkoxylated starch" shall mean starch that has been modified with pendent hydroxyalkoxy groups of two to six carbon atoms. A particularly preferred modified starches is (partially) hydroxyethoxylated starch, which has been found to result in good crust-formation, as will be discussed below, while showing strong resistance to setback, although starches that have been partially hydoxypropoxylated, partially hydroxybutylated or partially hydroxyalkoxylated by some combination or subcombination of hydroxyethoxylation, hydroxypropoxylation and hydroxybutoxylation are deemed desirable as well. Alternatively, the starch may be esterified by hydroxycycloalkoxylation, such as by reaction with epoxycyclohexane. Starch etherification techniques are well known and, as noted above, U.S. Pat. No. 2,516,633 illustrates one such technique. Such modifications have been found to lower the viscosity of the resulting suppressant, therefore permitting easier handling and application.

Also, as in U.S. Pat. No. 2,516,633, a relatively low level of etherification, such as about 0.5% by weight to about 5% by weight, preferably about 1% by weight to about 2% by weight, and especially about 1.5% by weight, based on the weight of the etherifying agent (or pendent ether groups) to the weight of the starch is preferred. Thus, references herein to etherified or hydroxyalkoxylated (or hydroxyethoxylated, etc.) starches include modified starches of such low levels of etherification, which is referred to herein sometimes as "lightly etherified" or "lightly hydroxyethoxylated."

As noted above, a gelatin may be produced by cooking an aqueous mixture of the modified or unmodified starch. The gelatin produced from the cooking step noted above is also called a paste, even when it is a mobile liquid. Techniques for preparation of such gelatins are well known and are described in, for example, U.S. Pat. No. 4,642,196, incorporated herein by reference. For convenience, when it is clear that the composition being discussed has been cooked, the gelatinized starch produced in the cooking (i.e., the solids derived from the starch during the cooking step) will be referred to sometimes herein generally as "starch" even though the granules have been ruptured or otherwise altered during the cooking step. At other times, however, it will be referred to more specifically as "gelatinized starch" to clarify that it refers to a composition at a post-cooking stage (before or after dilution of the gel resulting from the cooking step) and all solids derived from the initial starch, whether or not altered during cooking, are intended to be encompassed by the phrase "gelatinized starch."

To ensure that the composition to be applied to the coal is free-flowing long enough for convenient application, the cooked mixture, which typically contains about 2% by weight to about 20% by weight gelatinized starch on a dry solids basis, may be diluted with water to produce a fluid containing about 2% by weight to about 10% by weight, preferably about 4% by weight to about 7% by weight, most preferably about 5% by weight, gelatinized starch on a dry solids basis. This diluted composition is suitable for direct application as the dust suppressant of the invention. Accordingly, the preferred dust suppressant is a fluid that contains at least about 90% by weight, preferably from about 90% to about 95% by weight water, based on total weight of the suppressant, and gelatinized starch, more preferably gelatinized modified starch, even more preferably gelatinized low molecular weight hydroxyalkoxylated starch, especially gelatinized hydroxyethoxylated starch. As noted above, however, optimally the starch is lightly hydroxyalkoxylated.

Although the resulting composition need contain no further ingredient and, in its most desired form is free of binding agents, wetting agents, lignosulfonates, polyarcrylates, polyvinyl alcohols, polyacrylamides and other polymers, such ingredients may be employed if so desired. In particular, it may be desirable in some circumstances to include a wetting agent to aid in spreading and penetration of the suppressant prior to crust formation.

Other ingredients may be included as well. A biocide or other preservative may be included in the composition as well prevent bacterial or fungal attack. Also, cross-linking agents such as glyoxal or borax may be added to increase water resistance upon re-wetting and to increase crust strength. In any event, the resulting composition ready for application to coal is sufficiently flowable at ambient temperatures to be referred to herein as a "fluid." Thus, while some prior art suppressants have required application temperatures in excess of 100° C. and/or extremely high pressures, preferred forms of the suppressants of the present invention are fluid and may be applied at temperatures below about 100° C., often below about 60° C., and typically even below about 40° C., and at ambient pressures or typical pressures used in spray applications. Thus, a particularly useful composition has been found to comprise, for example, about 5 wt. % lightly ethoxylated corn starch, about 0.2 wt. % to about 0.5 wt. % polysorbate-20 (polysorbate monolaurate, 20 mol ethoxylated) and 750 ppm gluteraldehyde as a preservative. Other embodiments that have been found more effective than plain starch contain:

(a) about 5 wt. % starch, about 750 ppm gluteraldehyde, about 0.1 wt. % to about 1 wt. % glycerin,
(b) about 5 wt. % lightly ethoxylated corn starch, about 0.2 wt. % to about 0.5 wt. % polysorbate-80 (polysorbate monooleate, 20 mol ethoxylated), and about 750 ppm gluteraldehyde (preservative)
(c) about 5 wt. % starch, about 750 ppm gluteraldehyde, about 0.1 wt. % to about 5 wt. % urea In the last-described composition, the urea appears to act as a humectant and so is easily removed from the crust by rain water. It has been found that the polysorbate-20 seems to act in such compositions primarily as a plasticizer and is less subject to removal by rainwater. Thus, it is believed that other humectants and starch plasticizers, such as those cited in claim 4 of U.S. Pat. No. 6,846,502 to Billmers et al., which patent is incorporated herein by reference, may be employed with similar advantages. Likewise, it is also believed that other similar surfactants, such as those derived from sorbitol or glycerin, may be employed with the benefits found with polysorbate-20 and polysorbate-80. Although surfactants with increased water-solubility may be less resistant to water removal than are surfactants with lower water-solubility, they are still understood to be effective in strengthening the films in the absence of a water wash.

The fluid may be applied to the surface of the mass of coal by wetting the coal (and dust) with the fluid in what would be conventional techniques if used with a conventional surface-wetting suppressant, including direct flow application and spraying. For example, the fluid can be applied to the surface of a mass of coal that has been loaded in a rail car. The fluid is applied to form a layer like a blanket over the exposed surface of the mass of coal. In a preferred embodiment, the layer does not extend above the surface of the mass of coal by more than about 0.5 cm to about 2 cm and does not penetrate more than about 3 cm into the mass, and typically no more than about. Upon drying, the fluid combines with coal particles at the surface and dries to form a crust over the surface of the mass of coal. Preferably, the crust is about 0.5 cm to about 5 cm, especially about 0.5 to about 2 cm, thick. The life of the crust may not be extremely long relative to conventional long-term suppressants, but is sufficient for the one- to two-week period that may be required for transport the coal.

If desired, the fluid can include foaming additives and applied to the coal surface as a foam instead of a spray. In this case, the foam collapses to produce a crust of about the same thickness as that formed without foam, but because it collapses, the foam provides a visual indication that the coal has been treated.

Regardless of whether the fluid is added as a foam or not, the fluid may be applied at a rate of about 0.1 to about 0.5 gallons, preferably about 0.15 to about 0.3 gallons, and more preferably about 0.18 to about 0.25 gallons, of fluid per square yard of surface of the mass of coal. This corresponds to about 10 to about 15 gallons of fluid per 110 tons of coal in a rail car and, for a 5% by weight starch fluid having a density of about 8.5 pounds/gallon, about 0.00001 to about 0.00003 pounds of gelatinized starch per pound of coal or about 2.5 pounds to about 13 pounds of gelatinized starch per 110 tons of coal. Preferably, the application rate is about 10 to about 15 gallons, or 0.00002 to about 0.00003 pounds of gelatinized starch per pound of coal. By similar analysis, a 10% by weight starch fluid in this situation corresponds to about 0.000021 to about 0.00006 pounds of starch per pound of coal, and a 2% by weight starch fluid in this situation corresponds to about 0.0000043 to about 0.000012 pounds of starch per pound of coal.

For convenience and shipping economies, the cooked starch mixture may be sold, shipped and/or stored in undiluted form and then diluted to the application concentration as discussed above at a convenient time prior to or during application to the mass of coal.

The dust suppressant as produced and prior to dilution typically contains about 15% by weight to about 20% by weight solids, which in a preferred embodiment are the starch and starch derivative. The concentrate form may also comprise a wetting agent. The wetting agent may be a single surfactant or it may comprise a plurality of surfactants. Although the wetting agent may make up more than 15% by weight of the solids, the economics can suggest a wetting agent concentration in the solids of less than about 15% by weight, such as about 2% by weight to about 10% by weight, for example, about 5% by weight to about 7% by weight.

As noted, the dust suppressant of this invention has been found to provide long term dust suppression without the need for lignosulfonates, polyarcrylates, polyvinyl alcohols, polyacrylamides or any other polymers or other additives conventionally employed for long term dust suppression. Indeed, in many situations, the present formulation has been found to provide even longer term and more effective dust suppression than achieved with such conventional formulations.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

A hot aqueous solution of unmodified corn starch (5 wt. %) was loaded in a trigger spray bottle and applied at 0.10, 0.18, and 0.26 gallons per square yard to sub-bituminous coal samples (<¼") and allowed to dry. At 0.10 gallons per square yard the crust was cohesive, thin, and brittle. However, at 0.18 and 0.26 gallons per square yard the crusts were self-supporting cohesive, and considerably thicker. Both the 0.18 and 0.26 gallon per square yard samples were judged to be adequate for use as a dust barrier in rail car transportation.

EXAMPLE 2

In a study to investigate the effect of molecular weight and degree of ethoxylation of the starch, samples of three ethoxylated starches of varying molecular weights: lightly ethoxylated high molecular weight (A), moderately ethoxylated moderate molecular weight (B), and heavily ethoxylated low molecular weight (C) were obtained and gelantinized to produce 10 wt. % aqueous solutions. The solutions were diluted to 5 wt. % and all were applied at 0.25 gallons per square yard to sub-bituminous coal samples (<¼") and allowed to dry. All formed acceptable crusts at least equal to the crust formed at 0.26 gallons per square yard in the previous example.

EXAMPLE 3

In a study to determine the thickness of crusts formed using high molecular weight lightly ethoxylated starch, a 5 wt. % aqueous solution of the lightly ethoxylated high molecular weight starch (A) of Example 2, above, was applied at 0.18, 0.15, and 0.12 gallons per square yard to sub-bituminous coal samples (<¼") and allowed to dry. The crusts were removed and weighed, taking into account the surface area and density (45 pounds per cubic foot) of the coal to determine the thickness of the crust formed. The crusts had calculated thicknesses of 10.9, 10.4, and 7.5 mm. The first two crusts formed strong continuous structures. The last crust (7.5 mm) was weak and brittle.

EXAMPLE 4

To investigate the effects of solar heat on the crusts formed, a 5 wt. % aqueous solution of starch A (from Example 2 above) was applied at 0.18 gallons per square yard to a 9" diameter pan of <¼" sub-bituminous coal. The sample was allowed to dry for 21 hours and formed a thick pliable sturdy crust. The sample was allowed to stand a further 21 hours then subjected to simulated solar heat using a single 250 watt heat lamp positioned at such a height as to heat the surface of the coal sample to no more than 80° C. After six hours the sample was cooled and the crust was then found to be fragile and easily broken with some large cracks.

EXAMPLE 5

To demonstrate the benefit of application of aqueous starch solution as a foam, a solution of 4.4 wt. % unmodified starch and 0.84% alpha-olefin sulfonate was applied to the surface of a sample of <½" sub-bituminous coal as a thick foam at a rate of 0.25 gallons per square yard and allowed to cure. The sample was then subject to simulated solar heat stress as discussed in the previous example and then subjected to a light and heavy water cycle the equivalent of $1/30^{th}$ and $1/10^{th}$ inch of rain respectively with drying in between water sprays. The crust was initially thick and pliable, but after the solar heat stress became thin, brittle, and segmented. The crust over underlying coal was unable to support a weight of 2.8 Newton per square centimeter. The crust recovered some strength after the water cycles, eventually being able to support approximately 8.3 Newton per square centimeter. A second solar heat treatment returned the crust to a thin friable segmented state.

EXAMPLE 6

To demonstrate the effect of humectants on the strength of starch crusts, a 5 wt. % aqueous solution of starch A (from Example 2, above) to which had been added 3 wt. % urea was applied at 0.18 gallons per square yard to a 9" diameter pan of <¼" sub-bituminous coal. The sample was allowed to dry for 72 hours and formed a thick pliable sturdy crust. The sample was then subjected to simulated solar heat using a single 250 watt heat lamp positioned at such a height as to heat the surface of the coal sample to no more than 80° C. After six hours the sample was cooled and the crust was then found to be cohesive and sturdy.

EXAMPLE 7

To demonstrate the effect of plasticizers on the strength of starch crusts, a 5 wt. % aqueous solution of starch A (from Example 2, above) to which had been added 0.6 wt. % glycerin was applied at 0.18 gallons per square yard to a 9" diameter pan of <¼" sub-bituminous coal. The sample was then subjected to simulated solar heat using a single 250 watt heat lamp positioned at such a height as to heat the surface of the coal sample to no more than 85° C. After six hours the sample was cooled and the crust had a measured strength (supported on underlying coal) of 11.6 Newtons/cm$^2$ and was found to be cohesive and somewhat pliable.

EXAMPLE 8

To demonstrate the effect of plasticizers on the strength of starch crusts with both rain and solar heat stresses, a 5 wt. % aqueous solution of starch A (from Example 2, above) to which had been added 0.6 wt. % glycerin was applied at 0.18 gallons per square yard to a 9" diameter pan of <¼" sub-bituminous coal. The sample was then subjected to a light and heavy water cycle the equivalent of $1/30^{th}$ and $1/10^{th}$ inch of rain respectively with drying in between water sprays. The sample was then heated as above using a single 250 watt heat lamp positioned at such a height as to heat the surface of the coal sample to no more than 85° C. After six hours the sample was cooled and the crust had a measured strength (supported on underlying coal) of 4.5 Newtons/cm$^2$ and was found to be brittle with some cracking.

EXAMPLE 9

To demonstrate the effect of saccharide-derived surfactants on the strength of starch crusts with both rain and solar heat stresses, a 5 wt. % aqueous solution of starch A (from Example 2, above) to which had been added 0.5 wt. % polysorbate-20 (PEG-20 sorbitan monolaurate), producing an opaque and significantly more viscous solution which was still flowable, was applied at 0.18 gallons per square yard to a 9" diameter pan of <¼" sub-bituminous coal. The sample was then subjected to a light and heavy water cycle the equivalent of $1/30^{th}$ and $1/10^{th}$ inch of rain respectively with drying in between water sprays. The sample was then heated as above using a single 250 watt heat lamp positioned at such a height as to heat the surface of the coal sample to no more than 85° C. After six hours the sample was cooled and the crust had a measured strength (supported on underlying coal) of 18.6 Newtons/cm² and was found to be somewhat pliable with minor cracking.

EXAMPLE 10

To further demonstrate the effect of saccharide-derived surfactants, and to test additional saccharide-derived surfactants on the strength of starch crusts with both rain and solar heat stresses, a 5 wt. % aqueous solution of starch A (from Example 2, above) to which had been added 0.5 wt. % polysorbate-80 (PEG-20 sorbitan monooleate) was applied at 0.18 gallons per square yard to a 9" diameter pan of <¼" sub-bituminous coal. The sample was then subjected to a light and heavy water cycle the equivalent of $1/30^{th}$ and $1/10^{th}$ inch of rain respectively with drying in between water sprays. The sample was then heated as above using a single 250 watt heat lamp positioned at such a height as to heat the surface of the coal sample to no more than 85° C. After six hours the sample was cooled and the crust had a measured strength (supported on underlying coal) of 11.6 Newtons/cm² and was found to be somewhat pliable with minor cracking.

EXAMPLE 11

A side-by-side comparison of three mixtures of starch (Starch "A" from Example 2, above), varying application rate and composition, was performed at an independent lab. The test samples were applied to 200 in² pans. The samples were then treated with approximately $1/30$" of simulated rain in the form of tap water and allowed to stand again. The samples were also tested for strength, defined as resistance to penetration by a ⅜" dowel attached to a platform with weights added. The samples were then treated with approximately $1/10$" of simulated rain in the form of tap water and allowed to stand again. The samples were again evaluated for appearance and the ability to generate dust on light blowing. The samples were again tested for resistance to penetration by a ⅜" dowel attached to a platform with weights added. Finally, the samples were exposed to simulated solar heat as described in the previous examples. The samples were evaluated a final time for appearance and strength. The following table summarizes the results of this testing:

What is claimed:

1. A method for treating a mass of coal to suppress emanation of coal dust therefrom, the mass of coal having, prior to treatment, an exposed surface from which dust may emanate, the method comprising applying to the exposed surface an aqueous fluid comprising gelatinized starch to form a layer of the fluid over the surface and drying the layer of the fluid to form a crust over the surface wherein the fluid is applied at a temperature below 50° C.

2. A method as set forth in claim 1 wherein the fluid further comprises a biocide.

3. A method as set forth in claim 1 wherein the layer is generally from about 0.5 cm to about 5 cm thick.

4. A method as set forth in claim 1 wherein the crust is generally from about 0.5 cm to about 2 cm thick.

5. A method as set forth in claim 1 further comprising the step of:
penetrating the mass with the fluid wherein the fluid does not penetrate to more than about 3 cm into the mass.

6. A method as set forth in claim 1 wherein the fluid is applied at a rate of about 3 gallons to about 15 gallons of fluid per 110 tons of coal.

7. A method as set forth in claim 1 wherein the fluid is applied at a rate of about 0.10 to about 0.50 gallons per square yard of surface.

8. A method as set forth in claim 1 wherein the fluid is a foam.

9. A method as set forth in claim 1 wherein the gelatinized starch is produced from a corn starch.

10. A method for treating a mass of coal to suppress emanation of coal dust therefrom, the mass of coal having, prior to treatment, an exposed surface from which dust may emanate, the method comprising applying to the exposed surface an aqueous fluid comprising gelatinized starch to form a layer of the fluid over the surface and drying the layer of the fluid to form a crust over the surface wherein gelatinized starch is a gelatinized hydroxyethoxylated starch.

11. A method as set forth in claim 10 wherein the fluid is a foam.

12. A method for treating a mass of coal to suppress emanation of coal dust therefrom, the mass of coal having, prior to treatment, an exposed surface from which dust may emanate, the method comprising applying to the exposed surface an aqueous fluid comprising gelatinized starch to form a layer of the fluid over the surface and drying the layer of the fluid to form a crust over the surface wherein the fluid comprises

|  | 5% starch "A" | 5% starch "A" Application rate | 5% Starch "A" with 0.5% Polysorbate-20 |
|---|---|---|---|
|  | 0.25 gal/yd² | 0.18 gal/yd² | 0.18 gal/yd² |
| Dust, light blowing | None | None | None |
| Strength after runoff test & 24 hour set: | 5.568 N/cm² | 4.193 N/cm² | 11.067 N/cm² |
| Dust, light blowing | None | None | None |
| Strength after rain test & 64 hour set: | 4.193 N/cm² | 4.193 N/cm² | 12.442 N/cm² |
| Dust, light blowing | None | None | None |
| Strength after 6 hour heat lamp: | <2.818 N/cm² | 2.818 N/cm² | 6.943 N/cm² |
| Dust, light blowing | Very little dust | Minimal dust | Very small amount |
| Dust, 22 mph wind tunnel | None | None | None |
| Appearance | Cracked, friable | Cracked, friable | Thick, somewhat pliable, some cracks | about 2% by weight to about 10% by weight starch based on the total weight of the fluid, wherein the fluid comprises at least about 90% by weight water based on the total weight of the fluid, wherein the fluid is applied at a rate of about 10 gallons to about 15 gallons of fluid per 110 tons of coal, and wherein gelatinized starch is a gelatinized hydroxyethoxylated starch.

13. A method as set forth in claim 12 wherein the fluid comprises about 5% by weight starch based on the total weight of the fluid.

14. A method as set forth in claim 13 wherein the fluid comprises about 90% by weight to about 95% by weight water based on the total weight of the fluid.

15. A method as set forth in claim 14 wherein the fluid is applied at a rate of about 2.5 pounds to about 13 pounds of gelatinized starch per 110 tons of coal.

16. A method for treating a mass of coal to suppress emanation of coal dust therefrom, the mass of coal having, prior to treatment, an exposed surface from which dust may emanate, the method comprising applying to the exposed surface an aqueous fluid comprising gelatinized starch to form a layer of the fluid over the surface and drying the layer of the fluid to form a crust over the surface wherein the fluid contains a polysorbate-20 as a plasticizer.

17. A method as set forth in claim 16 wherein the fluid further comprises at least one additional ingredient selected from the group consisting of humectants, cross-linking agents, mono-saccharides, oligo-saccharides, and surfactants.

18. A method as set forth in claim 17 wherein the fluid contains urea as a humectant.

19. A method as set forth in claim 17 wherein the fluid further comprises glycerin, wherein the glycerin acts as a plasticizer and humectant.

* * * * *